(12) United States Patent
Roux et al.

(10) Patent No.: US 6,500,229 B1
(45) Date of Patent: Dec. 31, 2002

(54) METHOD FOR TREATING STEEL WORKS DUST BY WET PROCESS

(75) Inventors: Gilles Roux, Isere (FR); Farouk Tedjar, Grenoble (FR)

(73) Assignee: Recupac, Le Cheylas (FR)

( * ) Notice: Subject to any disclaimer, the term of this patent is extended or adjusted under 35 U.S.C. 154(b) by 0 days.

(21) Appl. No.: 09/673,051

(22) PCT Filed: Apr. 8, 1999

(86) PCT No.: PCT/FR99/00813

§ 371 (c)(1),
(2), (4) Date: Oct. 6, 2000

(87) PCT Pub. No.: WO99/53108

PCT Pub. Date: Oct. 21, 1999

(30) Foreign Application Priority Data

Apr. 8, 1998 (FR) .............................. 98 04387

(51) Int. Cl.[7] .............................. C22B 7/02
(52) U.S. Cl. .............. 75/430; 75/431; 75/432; 75/961
(58) Field of Search .......... 75/961, 431, 430, 75/432, 743; 423/141; 205/369, 603, 607, 608

(56) References Cited

U.S. PATENT DOCUMENTS

| | | | |
|---|---|---|---|
| 4,332,777 A | 6/1982 | Pazdej ........................ | 423/98 |
| 4,992,149 A | 2/1991 | Nguyen ....................... | 204/96 |
| 5,286,465 A * | 2/1994 | Zaromb et al. ............. | 423/106 |

FOREIGN PATENT DOCUMENTS

| | | | |
|---|---|---|---|
| DE | 26 47 006 A | | 6/1977 |
| DE | 283 423 A5 | | 10/1990 |
| EP | 0 420 525 A2 | | 4/1991 |
| FR | 2 362 669 A | | 3/1978 |
| FR | 2 510 141 A | | 1/1983 |
| FR | 2 579 998 A | | 10/1986 |
| GB | 1568362 | | 5/1980 |
| JP | 05264178 A | * | 10/1993 |
| WO | WO 97/06215 A | | 2/1997 |

OTHER PUBLICATIONS

ACS abstract of CN 1031985 A and CN 1013102 B by Ma et al, published Mar. 29, 1989 and Mar. 13, 1991, respectively (2 pages).*

Patent of Abstracts of Japan: Method for Recovering ZN from ZN Containing Material, Koji, JP 61261446, Nov. 19, 1986, p 1.

Database WPI, J58081961, Zinc Pptn. on Surface of Aluminum Workpiece, Nippon Light Metal Co., May 17, 1983, p1.

* cited by examiner

Primary Examiner—Roy King
Assistant Examiner—Tima McGuthry-Banks
(74) Attorney, Agent, or Firm—Perman & Green, LLP

(57) ABSTRACT

A method for treating steel works dust in order to recuperate elements capable of being upgraded. The method comprises attrition in water followed by hydraulic grading of the resulting load. The method is characterized in that is further comprises: a washing step to separate the water soluble saline fractions of the insoluble oxides; hot treatment to eliminate metals in the form of free oxides such as zinc and lead; treatment by heating at a temperature ranging between 240 and 800° C.; treatment with sulphuric acid having a concentration between 5 and 8%.

22 Claims, 3 Drawing Sheets

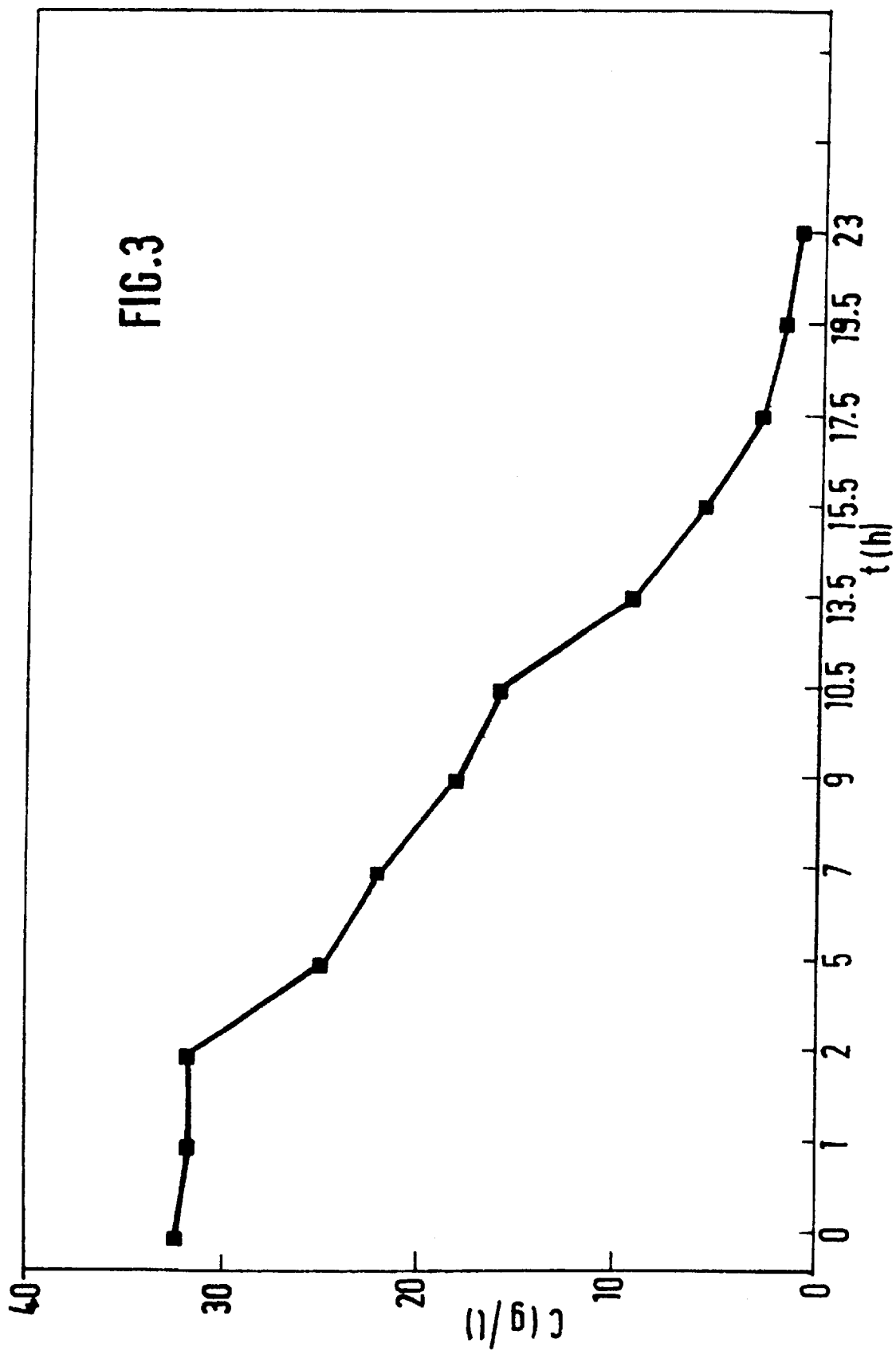

METHOD FOR TREATING STEEL WORKS DUST BY WET PROCESS

BACKGROUND OF THE INVENTION

Field of the Invention

The invention relates to the technical field of the treatment of dust from steelworks, notably electric steelworks.

BRIEF SUMMARY OF THE INVENTION

According to a first general object, the invention discloses a method and an installation for treating said dust allowing elimination of the heavy metals it contains.

According to a second general object, the invention discloses a method and an installation for treating said dust allowing maximum economic recovery of the most abundant fraction of this dust.

The term heavy metal, which has come into use in many legislations, relates to metals which are generally:

non-degradable over time;

toxic to living systems at very low concentrations;

inclined to accumulate in living organisms and to become concentrated in the course of transfers of materials in food chains.

Steelworks dust, for example issuing from remelting in the electric furnace of scrap iron for the production of steel, contains such heavy metals such as zinc, cadmium and lead, for example.

Dust production is between 15 and 22 kg per tonne of liquid steel.

As a guide, steel production, in Europe, was of the order of over 500,000 tonnes per year at the beginning of the 1990s.

DESCRIPTION OF THE PRIOR ART

Consequently, there is a considerable need for effective treatment of this dust, for the sake of protecting the environment notably.

A number of methods have been envisaged for the treatment of this dust, the methods varying depending on the composition of said dust.

Two main classes of dust are distinguished, depending on the nature of the steels produced, carbon steels and stainless alloyed steels.

In the case of carbon steels, zinc (17 to 29%) is present in the dust in two forms: zinc oxide, ZnO, and zinc ferrite, $ZnFe_2O_4$, while the lead (4 to 5%) is in oxide form (PbO) The cadmium contents are lower, of the order of around 800 ppm.

Unlike zinc oxide, zinc ferrites are not easily soluble during hydrometallurgical treatments for releasing the zinc.

For alloyed and stainless steels, the quantity of dust generated in Europe was around 50,000 tonnes per year during the 1990s.

Various procedures and processes, many still at the experimental laboratory stage, have been devised for the treatment of dust from steelworks, notably electric steelworks.

The BUS (BERZELIUS UMWELT) procedure proposes a treatment of dust from steelworks for carbon steels combining two processes: the WAELZ process and the ISP (IMPERIAL SMELTING PROCESS). This procedure uses a conventional pyrometallurgical process and condensation of the zinc vapours by means of liquid lead spray condensers.

The FLAME REACTOR process, used for the treatment of dust from alloyed and stainless steels, consists essentially of vertical flame smelting/reduction cyclone separation. The waste products, rich in zinc and lead, are converted into slag to be resmelted and into oxide to be recovered.

The PLASMADUST process has been used since the 1980s for the treatment of electric steelworks dust rich in zinc and lead. The treatment furnace is of the tank furnace type, whose energy is provided by blown arc plasma torches. The energy of the plasma is used to heat the reagents, and to provide the heat necessary for the endothermic reduction reactions. The plasma-producing gas is introduced into the furnace by water-cooled copper nozzles. The powdery charge composed of dust, flux and coal is injected into the nozzles and mixed with the plasma-producing gas. The fumes charged with metallic vapours leave the furnace at a temperature of around 1150° C.

When the PLASMADUST process is used for dust from alloyed and stainless steels, the zinc content in the fumes is generally too small for condensation of the zinc to be efficient, the zinc in this case being retrieved from the sludge issuing from the washers.

The PLASMINOX process uses a treatment by means of hot cathode plasma torches operating by transferred arc at D.C. and installed vertically on the furnace. In the furnace, the metals present—chromium, nickel, molybdenum and iron—are separated from the dust by melting and the ferroalloy which results therefrom is poured into moulds for subsequent recharging at the dust-producing steelworks. The scorias obtained are, in accordance with the standards, inert. The fumes escaping from the furnace are cooled and have their dust removed. The secondary dust obtained contains volatile metals $Z_n$, $P_b$ which are in the form of oxides and are not recovered.

The modified ZINCEX process produces zinc by hydrometallurgical means, this process having the following successive steps:

atmospheric leaching of the dust by a dilute sulphuric acid solution;

purification of the leaching solution by precipitation of the iron and aluminium;

selective extraction of the zinc by D2EHPA;

stripping of the zinc from the organic phase by the highly acid electrolytic solution;

electrodeposition of the zinc on to aluminium cathodes.

The ZINCEX process is relatively complex in its implementation since it requires organic solvents combined with sulphuric acid. Furthermore, this process requires large quantities of wash water to avoid the formation of $SO_2$ from the oxides which are recycled in the furnace. This ZINCEX process is not easily exportable, owing to the abovementioned problems and since it necessitates too heavy investments.

The GLASSIFICATION process comprises a step of mixing the steelworks dust with other steelwork waste products and constituents of glass. The mixture is melted in a submerged arc furnace. The metals vaporized during the melting condense in the upper part of the furnace before being trapped in the melt. The glass obtained can be put in the form of granules for the manufacture of glass tiles or grit.

In total, three main ways of recycling have been envisaged for recycling dust from electric steelworks.

A first way consists of performing reductions at various temperatures in accordance with the processes for vaporizing the heavy metals and re-injecting the ferrous fraction into the steel production furnaces:

the document EP 336 923 proposes treating steelworks dust in an iron smelting furnace after conversion into pellets;

the document EP 441 052 proposes a thermal treatment between 1200 and 1700° C. by the addition of reducing agents;

the document WO 91/12 210 describes a method of treating steelworks dust in an iron reduction furnace, the heavy metals being retrieved by condensation from the hot gases;

the document EP 453 151 describes a method of treating dust in the form of pellets by an agent selectively reducing iron oxide;

the document FR 2 666 592 describes a device for extracting volatile metals acting by oxidation;

the document WO 93/69 619 describes an arc furnace specially designed for the reduction of dust containing oxides;

the document EP 551 992 describes a method of retrieving recoverable metals from steelworks dust by reduction and vaporization of the recoverable metals;

the document FR 2 373 612 describes a method of extracting zinc contained in steelworks dust, by selective oxidation under heat.

A second way consists of directing the dust towards a use where it would be "made inert" by various means with a view to use as construction or filler materials:

the document EP 402 746 proposes recycling by incorporation in a clay for a mine packing material;

the document WO 91/12 210 proposes the use of steelworks dust for the treatment of sewage with the addition of a flocculating agent;

the document FR 2 689 881 describes a method of manufacturing bricks whose properties are improved by the addition of electric steelworks dust first calcined at the vaporization temperature of heavy metals contained in said dust;

the document FR 2 700 161 describes a mixture for a road surfacing comprising 2 to 6% by weight of electric steelworks filter dust.

Pyrometallurgical processes, with or without electricity, allow the recovery of oxides of zinc, of iron or nickel chromium alloy or of liquid zinc most often by condensation.

A third way, hydrometallurgical, has also been envisaged.

Various media such as sulphuric acid, hydrochloric acid, soda and ammonia have been tried out.

The document FR 2 716 895 describes a method of treating electric steelworks dust with or without prior reduction, or electrolytic galvanizing dust. Said method comprises an ammoniacal attack by an ammoniacal buffer solution, then a desorption of the ammonia by air flow cleaning.

Direct attacks in a sulphuric or hydrochloric medium are not economically viable, since the volumes in terms of iron hydroxide or salts involved are enormous.

These residues are moreover still contaminated by metallic impurities such as lead and cadmium.

Alkaline leaching has been proposed.

The document FR 2 535 736 describes a method of treating dust containing zinc, issuing from electric steelwork furnaces, in which the dust is subjected to a basic leaching. The basic rejects resulting from the different washing phases and containing zinc are neutralized by means of the acid rejects coming from galvanization operations and also containing zinc.

The document FR 2 501 141 describes a basic leaching of zinc-bearing dust by means of ammonium chloride, the powder obtained being agglomerated and introduced into a smelting furnace.

By the leaching technique, only the elements in the form of free oxides (mainly zinc and lead) are dissolved. The mixed oxides of non-ferrous metals/ferrous oxides are not affected. Their management is therefore problematic, including re-injection into the steelworks furnace which leads, in the end, to a problem of re-concentration of impurities.

The methods combining liquid ammonia with ammonium salts (notably the ENGITEC process described in European patent application EP-93 00018.5) have drawbacks in the handling of chlorides for the retrieval of minority elements (zinc, lead and cadmium) and the recovery of iron oxides. The high chloride content prevents recycling of these phases in the furnaces owing to the problems related to chlorine. Their washing would require considerable volumes of water.

It can therefore be thought that this type of method has a maximum efficiency between 25 and 30%, proportional to the concentration in the non-ferrous phase. This method therefore generates a waste product whose management remains as problematic as that of the untreated dust.

The document FR 2 737 503 describes a method of preparing mineral pigments, and the mineral pigments thus obtained, and an installation for the implementation of such a method. This document, coming from the applicant, describes a method having the following steps:

separation of the dust into two fractions, one fraction comprising magnetic elements and one fraction comprising non-magnetic elements;

basic leaching of the non-magnetic fraction in order to dissolve the zinc fraction which would not be bound up in spinel form, and the silica, lead, and a fraction of the manganese;

rinsing until neutralized and separation of the charge thus obtained;

calcination at a temperature between 450 and 650° C. of the charge thus obtained;

treatment of the calcined charge with sulphuric acid in the presence of a catalyst for solubilizing the iron oxides formed during the calcination step and the heavy metals other than zinc;

collection of the mineral pigments;

use of the solutions issuing from the rinsing and the sulphuric acid treatment for precipitating other pigments.

The present invention proposes a method of neutralizing the free heavy metals contained in the dust from steelworks, notably electric steelworks, said method also allowing the recovery of the most abundant fraction of said dust.

The method according to the invention makes it possible to treat indiscriminately the so-called acid dust and the so-called basic dust.

The method according to the invention makes it possible to geographically dissociate pre-treatment of the dust at the collection site and chemical treatment and recovery from said dust.

The method according to the invention is particularly adapted to the treatment of dust from carbon steels and tool steels.

The invention relates, according to a first aspect, to a method of treating steelworks dust with a view to retrieval of the recoverable elements, said method comprising an attrition in water followed by a water grading of the charge thus obtained, said method being characterised in that it also comprises:

washing of the charge collected at the overflow issuing from the water grading, said charge being charged with dissolved heavy metals and salts, with a view to separating the water-soluble saline fractions from the insoluble oxides, treatment under heat of the whole of the charge, washed in the previous washing step without prior magnetic separation, with a view to eliminating the metals in the form of free oxides such as zinc and lead, treatment by thermal means of the charge obtained after treatment under heat at a temperature between 240 and 800° C.

The method also has the following aspects, possibly combined.

A step of treatment with sulphuric acid with a concentration of between 5 and 8% is carried out after the treatment by thermal means.

The treatment under heat performed after the washing step is, according to a first variant, carried out in an acid medium. Said acid medium is, in one embodiment, a sulphuric acid solution at a concentration of between 8 and 18% and a temperature of between 40 and 95° C.

The treatment under heat is followed by an oxidation and then a separation of the iron in the form of an insoluble oxide precipitate.

The zinc is separated by means of an acid electrolysis.

The treatment under heat performed after the washing step is, according to a second variant, carried out in an alkaline medium.

According to one embodiment, the washing comprises treatment with a sulphur derivative chosen from amongst the group of heterocyclic compounds such as trimethyl triazine or 2,5 dimercapto thiadiazole.

The alkaline treatment is performed in a concentrated soda solution under heat in the presence of an oxidizing agent.

The concentration of the soda solution is between 240 and 400 g/l.

The temperature of the alkaline treatment is between 50 and 110° C.

The oxidizing agent is chosen from amongst the compounds which are oxidizing in an alkaline medium such as hydrogen peroxide.

The hydrogen peroxide concentration is between 10 and 40%, and more particularly between 30 and 35%. The lead contained in the alkaline solution is eliminated by means of hydrogen peroxide with a concentration equal to at least 35% by weight.

The treatment by thermal means is performed between 400 and 650° C.

The treatment with sulphuric acid is carried out in the presence of an injection of air in order to oxidize the divalent iron into trivalent iron.

The treatment with sulphuric acid is carried out under heat at a temperature between 40 and 80° C.

The solution issuing from the acid attack is adjusted to a pH between 5.4 and 10.

The solution issuing from the acid attack is adjusted to a temperature between 25 and 80° C.

The solution issuing from the acid treatment is purified by means of iron or zinc powders.

The method also comprises a two-stage electrolysis of the solution issuing from the alkaline treatment.

Said first electrolysis uses a cathode of graphite in grains contained in a basket in contact with a titanium grid.

The basket is made of polypropylene.

The anode is made of titanium containing ruthenium or iridium.

The second electrolysis comprises an anodic re-dissolution of the graphite cathodes in a sodium sulphate solution and a cathodic re-deposition of the zinc on an iron or steel electrode.

The second electrolysis is carried out in an electrolyser whose pH is adjusted to a value close to 5.

Other objects and advantages of the invention will emerge in the course of the following description of embodiments, said description being given with reference to the accompanying figures in which:

BRIEF DESCRIPTION OF THE DRAWINGS

FIG. 3 is a graph depicting the variations in zinc concentration over time, during electrolysis of a solution at 80A and 3V. The zinc concentration C, in grams per litre of solution, is given along the y-axis, the time t in hours being along the x-axis.

DETAILED DESCRIPTION OF THE INVENTORS

Figure 1:
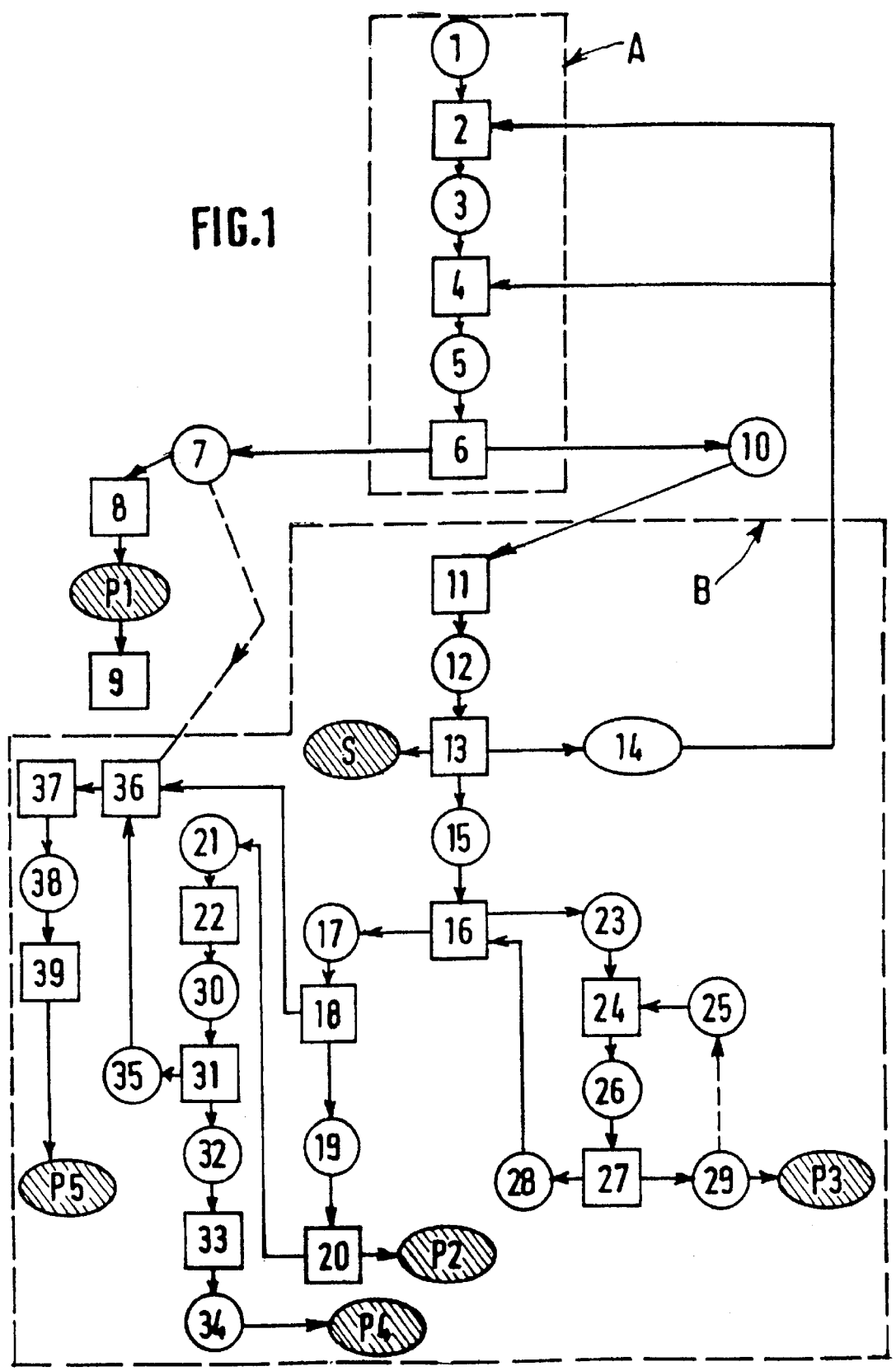
FIG. 1 is a schematic diagram depicting the steps of the method, according to one embodiment, the numerical references contained in a circle corresponding to the intermediate products obtained during the method, the final products being notably the products P1, P2, P3, P4, P5 and S.

A few general technical data are first presented before describing the invention in different embodiments.

Steelworks dust results from at least two reactions.

The most volatile metals pass into the vapour phase at the furnace operating temperature. Under the effect of air suction, these volatile metals are then oxidized and cooled and find themselves either in the form of free oxides, or in the form of structures mixed with iron oxides.

Above the molten melt, fine particles of iron are dispersed in the vapour phase and carried along by the air suction. In this air current, they are cooled and, under the action of the oxygen in the air, converted into higher oxides.

Interaction between these oxides and the heavy metals can lead to the formation of spinel type compounds $MFe_2O_4$ (M=zinc, nickel, manganese or cadmium). If M is iron, the phase is composed of magnetite.

Electric steelworks dust therefore contains variable quantities of iron, zinc, calcium and silicon type majority elements in the form of simple or mixed oxides and minority elements such as copper, manganese, chromium, cadmium, lead and the chlorides.

The dust is considered toxic because of graining out of the heavy metals by leaching and therefore comes under Class 1 discharges.

On this subject, the regulations in France provide that, from 2002, only waste products said and confirmed to be final will be accepted in Class 1 discharges.

Electric steelworks dust has very broad granulometric distributions since it contains fractions between 0.1 and 150 microns.

Moreover, this dust has a strong tendency to agglomerate.

This property rules out any possibility of dry screening, including that assisted by ultrasound.

Granulometric study of electric steelworks dust shows that the chemical composition of the fractions depends greatly on the granulometry.

Thus, the largest fractions are the richest in metallic iron.

As the dust also results from physical agglomeration of small-sized particles around a larger central grain, only an attrition in water makes it possible to break up the agglomerates. This advantageously facilitates the separation of the charge into two fractions (larger or smaller than 40 microns for example).

The attrition operation assumes great importance since it makes it possible:

to accelerate the dissolution of the soluble salts;

to reveal the metallic fractions which are masked by the oxides absorbed on the surface.

The steelworks dust treatment method according to the invention comprises first an attrition in water of untreated dust 1.

The solid/liquid ratio must be judiciously chosen in order to put suitable friction between the solid particles while providing a sufficient volume to ensure dissolution of the soluble fractions.

A solid/liquid ratio between 2.3 and 2.5 is satisfactory in this respect.

After the attrition operation 2, the charge 3 is diluted (operation 4) sufficiently to complete the dissolution of the salts, put the very fine particles into suspension, and provide a pulp density 5 adapted to a water grading 6.

The water grading 6 is advantageously performed in hydrocyclones with cut-points adapted to the granulometry of the incoming dust.

The hydrocyclones operate in continuous mode and are essentially constituted by a vertical cylinder where the separation takes place, provided at its base with a cone for retrieving the solid, closed by a horizontal surface at its upper part.

The pulp 5 is introduced tangentially into the upper part of the cylinder at high speed.

The charge collected at the underflow 7 of the cyclones is rich in carbon, iron and magnetite. This charge is decanted, dried (operations referenced under the number 8) and the product P1 obtained can be re-injected into the steel production furnaces 9.

The charge collected at the overflow 10 is charged with dissolved heavy metals and salts.

According to one particular embodiment, the charge is then treated at 11 with a sulphur derivative chosen from amongst the heterocyclic compounds such as trimethyl triazine (TMT) or 2,5 dimercapto thiadiazole (DMT) in order to eliminate all the heavy metals in solution without additional mineralization.

The saline solution obtained 12 is then subjected to a concentration at 13 in order to retrieve the salts S and recycle the water 14 thus purified.

This concentration step 13 is carried out by evaporation, crystallization or concentration by membrane.

According to a first variant, the charge 15 issuing from the concentration step is subjected to an acid treatment.

Thus, for example, 50 kg of dust issuing from the washing is attacked by a 15% sulphuric acid solution at a temperature of 80° C. for 3 hours.

After filtration and separation of the insoluble residue, the pH of the solution is brought back to a value of 3.8 by means of iron powder, and then this solution is oxidized by means of hydrogen peroxide in a stoichiometrical ratio with respect to the iron. An orange-red precipitate appears.

The suspension obtained is heated at 90° C. for one hour, then filtered and the separated solid is backwashed in a filter press.

The solution obtained by filtration contains an iron concentration lower than 1 mg/l and around 18 g/l of zinc. It is subjected to an electrolysis in an acid medium leading to the production of solid zinc.

According to a second variant, the charge 15 issuing from the concentration step 13 is treated at 16 with a concentrated soda solution under heat in the presence of a specific oxidizing agent.

This oxidizing agent can be chosen from amongst the compounds which are oxidizing in an alkaline medium.

Hydrogen peroxide or ozone can advantageously be chosen with a view to non-contamination of the medium.

Water and oxygen are the only products obtained after reaction of $H_2O_2$.

This concentrated soda treatment step 16 makes it possible to dissolve:

the fraction of the zinc which would not be bound up in spinel form;

the silica;

the lead.

After this first chemical treatment, the solid charge obtained 17 is rinsed until neutralized and separated at 18 by the most appropriate separation means.

This step 18 can be performed by means of a membrane filter press with a backwashing device.

The solid obtained 19 is then calcined at 20 at a temperature between 400 and 650° C. in a fluidized bed furnace capable of accepting sludge at the input.

If the calcination temperature is not within the stated range, undesirable crystallographic structures may form.

A calcined charge 21 is thus obtained, this charge 21 coming out in powder form, this avoiding an expensive grinding. This powder P2 may find applications in the pigment field.

The calcined charge 21 can also be treated at 22 with moderately concentrated sulphuric acid in the presence of an injection of air in order to oxidize the divalent iron into trivalent iron.

This operation can be performed under heat.

The alkaline attack solution 23 issuing from the soda treatment 16 is charged with zinc and lead.

The solution 23 is purified at 24 by the addition of zinc powder 25 in order to carry out cementation of the lead. This zinc powder can be that obtained by the method of the invention.

Cementation here means a deposition by reduction in which a noble metal body, oxidized and dissolved, is reduced by another metal body added to the solution in powder form. Cementation is a known process for metals such as As, Cd, Co, Cu, Pb, Ni, Sb and Sn.

In the case of untreated dust 1 rich in lead, according to one embodiment of the invention, the lead can be eliminated by oxidation.

Thus, by way of an illustrative example: to one litre of alkaline solution 23 containing 11 g/l dissolved lead in the form of plumbate, there is added 60 ml of hydrogen peroxide at 35% by weight in successive fractions of 20 ml.

The plumbate concentration falls from 11 g/l to 5 g/l and then to 0.8 g/l.

Through this variant, it is possible:

to obtain a relatively pure lead oxide with a view to better recovery;

to save on zinc powder which is not used in this variant to carry out cementation of the lead.

The purified solution obtained 26 is slightly more concentrated in zinc is subjected to an electrolysis at 27.

It is known in the prior art that electrolysis of alkaline solutions of zinc (dissolved in the form of zincate) leads to the formation of highly reactive zinc powder.

This is because these powders oxidize spontaneously in air and are pyrophoric.

The handling of these powders is therefore very tricky. Full of soda, these powders must be abundantly rinsed and passivated.

The only reagent giving convincing passivation results is sodium dichromate. Thus, the alkaline electrolysis of zincates forces the introduction of chromium VI, a dangerous pollutant.

In order to avoid the drawbacks of the formation and handling of zinc powder, the electrolysis 27 is performed, in the invention, by a cell with two compartments.

The cathode compartment comprises a titanium electrode which provides the electrical contact with graphite balls on which the zinc will be deposited.

The cathode of graphite in grains is contained in a basket in contact with a titanium grid.

These balls are placed in a polymer basket with a mesh adapted to the granulometry of the graphite.

In one embodiment, the polymer used for producing the basket is polypropylene.

The anode is made of titanium containing ruthenium or iridium.

After the electrolysis step 27, the soda-enriched solution 28 is returned to the top of the process to be used for attacking the free zinc.

The cathode compartment assembly (titanium+graphite+deposited zinc) is immersed in a so-called "regeneration" electrolyser for the zinc containing demineralized water.

The pH of the regeneration electrolyser is adjusted to a value close to 5 in order to avoid the cathodic mass charged with soda causing a rise in pH.

The cathode is made of aluminium or iron.

The assembly comprising the titanium+graphite+initially deposited zinc compartment is polarized anodically so as to cause dissolution of the zinc.

The electrolysis 27 then leads to a deposit of zinc 29 on the metal plates of iron or aluminium, by cathodic redeposition of the zinc on these electrode-forming plates, made of iron or steel.

Some of this zinc 29 can be used in the cementation step 24.

The zinc obtained 29 forms a directly marketable product P3.

After alkaline treatment 16 and thermal treatment at 20, the charge 30 is subjected to a selective acid attack at 31 in order to dissolve the iron oxide without affecting the zinc ferrite phases.

The product obtained 32 is then washed and dried at 33.

The final product 34 is composed essentially of zinc ferrite whose shade of colour varies according to the degree of reduction and the zinc/iron ratio. This product 34, P4, can be used in the pigment industry.

The solution 35 obtained during the acid attack 31 is reserved for the remainder of the process.

This solution 35 will be used to produce iron oxyhydroxides by neutralization with soda using the alkaline charge wash waters.

In one embodiment, the underflow 7 issuing from the water grading 6 is subjected to an acid attack 36 by combining the solution 35 issuing from the alkaline charge attack and an addition of new acid in order to provide the dissolution of the ferrous compounds.

The controlled neutralization 37 of this solution leads to the precipitation of an iron oxyhydroxide 38 of FeOOH type.

The product 38 washed and dried at 39 has, in its final form P5, different shades of colour depending on the thermal treatment temperature.

This product P5 can be used as a pigment for applications in the construction industry for example.

The method and the installation just described define at least two distinct sub-units:
 a first sub-unit A in which the steps 2 (attrition), 4 (dilution) and 6 (water grading) are carried out, leading to an overflow 10 and an underflow 7;
 a second sub-unit B for physico-chemical treatment of the overflow 10.

The sub-units A and B can correspond to two installations geographically distant from one another.

In other words, the pre-treatment of the dust, for example on its collection site, said pre-treatment corresponding to the underflow, A, can be dissociated from a sub-unit B for physico-chemical treatment of the fines of the overflow 10.

Figure 2:
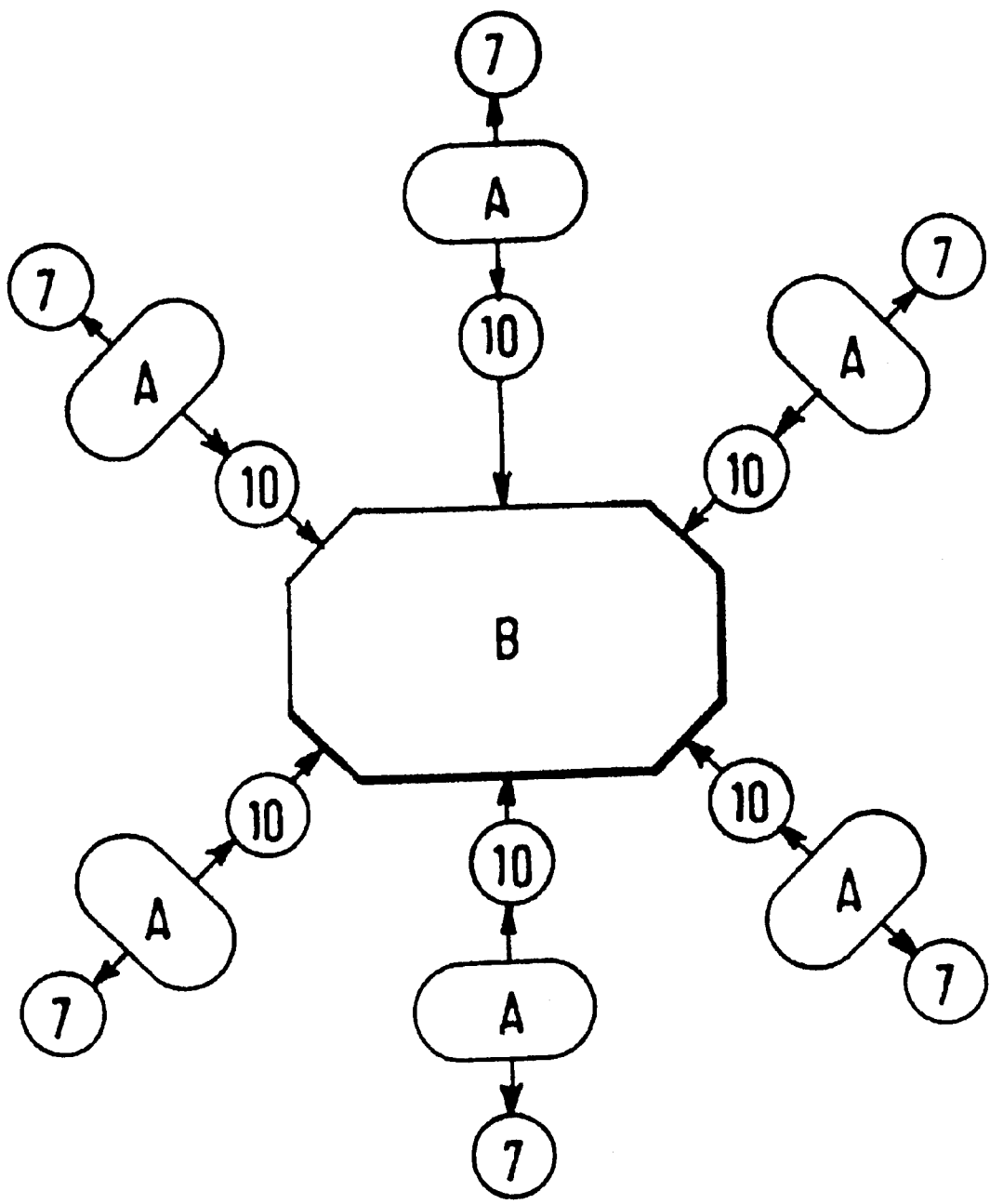
FIG. 2 is a schematic diagram showing a configuration with a number of sub-units A for pre-treatment of steelworks dust, associated with a single sub-unit for physico-chemical treatment B of the fines issuing from the pre-treatment.

As depicted in FIG. 2, a single sub-unit B can provide the treatment of the overflow fines issuing from a plurality of pre-treatment sub-units A.

Physico-chemical treatment and recovery of the overflow fines 10 is thus centralized and carried out on very large volumes, hence increased profitability.

As required, the waters 14 issuing from the concentration step 13 can be used for the attrition 2 and/or the dilution 4.

Similarly, in one embodiment, the underflow 7 can be involved in the dissolution of the ferrous compounds of the solution 35.

The sub-units B and A can then be geographically close.

EXAMPLE 17 kg of untreated dust 1 are subjected to an attrition 2 for 15 minutes in 7 litres of water.

After attrition 2, the charge 3 is diluted at 4 in 120 litres of water then subjected to a water grading 6 through a cyclone performing a cut at 5 microns.

Evaluation of the granulometric distribution shows two clusters centred:
 on 5 microns for the finest fraction (overflow 10). Analysis by scanning electron microscopy of this phase shows a very fine homogeneous powder morphology. This phase 10 is very rich in zinc, the concentration of which may reach 30%.
 on 100 microns for the residue 7 which constitutes 14% of the incoming charge 1. Analysis by scanning electron microscopy of this phase 7 shows the presence of balls of regular shape whose iron content is considerable (80%). This phase 7 contains only 6% zinc.

After separation of solid and liquid, the water is subjected to a depollution treatment.

100 litres of water 10 are treated by means of 4.5 g of 2,5 dimercapto thiadiazole.

After agitation for one hour, a flocculent is added and the solution is filtered through a filter press.

Analysis shows that the elements such as zinc, lead, mercury and cadmium are at a concentration lower than 0.05 mg/l.

The clear solution is subjected to a reverse osmosis treatment in order to obtain a brine at 90 g/l and a water 14 of industrial quality re-usable at steps 2 and 4 of the process notably.

200 kg of the charge 15 are subjected to a basic leaching 16 by means of soda at 30% by weight, for 30 minutes at a temperature of 90° C.

After filtration, the solid fraction 17 is washed until neutralized then dried and calcined at 20 at a temperature of 400° C. for 4 hours.

The product P2, 21 obtained already finds applications for example as an additional charge in pigments based on iron oxides.

The solid charge cleared of soluble salts and heavy metals is treated with sulphuric acid with a concentration of between 5 and 18% for 2 hours at 60° C. Throughout the duration of the reaction, air or oxygen is injected at the base of the attack reactor.

The solid 34, P4, obtained meets the characteristics of the nomenclature of pigments based on iron oxides.

The solution 35 issuing from the acid treatment 31 can be treated according to the method described in the patent FR 95 09 548, through neutralization 37, at 60° C. to a pH of 5.4 while maintaining a bubbling through of air at 600 l/h.

The precipitate obtained 38 is washed and dried at 250° C. in a circulating air drier.

What is claimed is:

1. A method of treating steelworks dust with a view to retrieval of the recoverable elements, said method comprising an attrition in water (2) to obtain a charge followed by a water grading (6) of the charge (5) thus obtained wherein an overflow (10) issues from said water grading, said method being characterized in that it also comprises:

washing (11) of a charge collected at the overflow (10) issuing from the water grading (6), said charge being charged with dissolved heavy metals and salts, with a view to separating water-soluble saline fractions from insoluble oxides, treating under heat (16) of the whole of the charge, washed in the previous washing step (11) without prior magnetic separation, with a view to eliminating the metals in the form of free oxides, treating by thermal means (20) of a charge (17) obtained after treatment under heat (16) at a temperature between 240 and 800° C.

2. A method according to claim 1, characterized in that a step of treatment with sulfuric acid (22) with a concentration of between 5 and 8% by weight is carried out after the treatment by thermal means (20).

3. A method according to claim 1, characterized in that the treatment under heat (16) performed after the washing step (11) is carried out in an acid medium.

4. A method according to claim 3, characterized in that the treatment under heat in an acid medium is performed in a sulfuric acid solution at a concentration of between 8 and 18% by weight and a temperature of between 40 and 95° C.

5. A method according to claim 3, characterized in that the treatment under heat step (16) is followed by an oxidation and then a separation of iron in the form of an insoluble oxide precipitate.

6. A method according to claim 1, characterized in that a metal separated in the form of a free oxide by means of an acid electrolysis is zinc.

7. A method according to claim 1, characterized in that the treatment under heat (16) is an alkaline treatment performed in a concentrated soda solution under heat in the presence of an oxidizing agent, the concentration of the soda solution being between 240 and 400 g/l, and the temperature of the alkaline treatment (16) being between 50 and 110° C.

8. A method according to claim 7, characterized in that the oxidizing agent is chosen from amongst compounds which are oxidizing in an alkaline medium.

9. A method according to claim 8, characterized in that the alkaline medium is hydrogen peroxide having a concentration between 10 and 40% by weight.

10. A method according to claim 8, characterized in that the hydrogen peroxide concentration is between 30 and 35% by weight, a metal contained in the alkaline solution (23) is lead, the lead being eliminated by hydrogen peroxide with a concentration equal to at least 35% by weight.

11. A method according to claim 1, characterized in that the treatment by thermal means (20) is performed between 400 and 650° C.

12. A method according to claim 5, characterized in that the treatment under heat step (16) is a treatment with sulfuric acid (22) which is carried out under heat at a temperature between 40 and 80° C.

13. A method according to claim 12, characterized in that the solution issuing from the sulfuric acid treatment is adjusted to a pH between 5.4 and 10.

14. A method according to claim 12, characterized in that the solution issuing from the sulfuric acid treatment is adjusted to a temperature between 25 and 80° C.

15. A method according to claim 12, characterized in that the solution issuing from the sulfuric acid treatment is purified by means of iron or zinc powders.

16. A method according to claim 7, characterized in that it also comprises a two-stage electrolysis (27) of a concentrated soda solution (26) issuing from the alkaline treatment (16).

17. A method according to claim 16, characterized in that the metal is zinc, and that the first electrolysis stage consists of a reduction of zinc in a concentrated basic medium.

18. A method according to claim 17, characterized in that said first electrolysis stage uses a cathode of graphite in grains contained in a basket in contact with a titanium grid.

19. A method according to claim 18, characterized in that the basket is made of polypropylene.

20. A method according to claim 16, characterized in that the electrolysis includes the use of an anode made of titanium containing ruthenium or iridium.

21. A method according to claim 18, characterized in that the second electrolysis stage comprises an anodic re-dissolution of the graphite cathode in a sodium sulphate solution and a cathodic re-deposition of the zinc on an iron or steel electrode.

22. A method according to claim 21, characterized in that the second electrolysis is carried out in an electrolyser whose pH is adjusted to a value close to 5.

* * * * *